METHOD OF MAKING SUPER-CONDUCTIVE WIRES
Filed Sept. 25, 1963
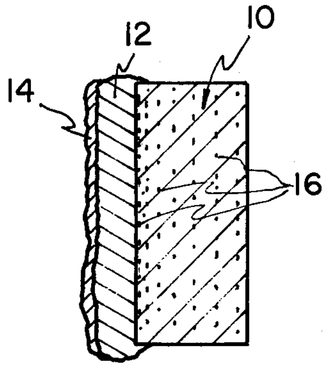

United States Patent Office 3,262,187

Patented July 26, 1966

3,262,187
METHOD OF MAKING SUPERCONDUCTIVE WIRES

Lloyd R. Allen, Belmont, and Lewis R. Koller, Cambridge, Mass., and Anton E. van Arkel, Leiden, Netherlands, assignors to National Research Corporation, Cambridge, Mass., a corporation of Massachusetts Filed Sept. 25, 1963, Ser. No. 311,438
10 Claims. (Cl. 29—155.5)

The present invention relates to the manufacture of superconductors and more particularly to the manufacture of flat superconductive wires having diffusion layers therein.

The copending applications of Allen, Das and Stauffer, Ser. No. 207,320, filed July 3, 1962, issued as Patent No. 3,218,693 and Ser. No. 218,723, filed May 7, 1963, teach a method of manufacturing niobium stannide superconductors by cold working adjacent layers of niobium and tin to extend their interface and thereby disperse surface contaminants. Then the layers are heated to melt the tin which completely wets the niobium surface and the molten tin diffuses into the surface of the niobium. The tin and niobium react to produce a thin surface diffusion layer of superconductive niobium stannide. The resultant product is bendable into coils without destruction of the superconductivity of the stannide layer.

It is the principal object of the invention to improve the reliability of the above process.

It is a further and related object of the invention to make the above process easier by new preliminary steps which reduce the amount of cold work necessary to produce a completely wettable surface.

It is a further object of the invention to provide an improved method of producing diffusion layer superconductors which strengthens the resultant product.

Still another object of the invention is to provide improved superconductors with thin diffusion layers of superconductive alloys such as the compound niobium stannide which have increased strength compared to prior art superconductors.

It is a further object of this invention to provide a suitable method for cladding the reactive metals, Nb, Ta, V, Zr, Hf, Ti, with a soft metal which is corrosion resistant.

It is a still further object to provide coated reactive metals which are completely wettable for forming diffusion layers of alloy at the substrate surface for purposes of brazing or forming superconductors.

Other objects of the invention will in part be obvious and will in part appear hereinafter.

The invention accordingly comprises the process involving the several steps and the relation and the order of one or more of such steps with respect to each of the others and the product possessing the features, properties and the relation of components which are exemplified in the following detailed disclosure, and the scope of application of which will be indicated in the claims.

For a fuller understanding of the nature and objects of the invention, reference should be had to the following detailed description, taken in connection with the accompanying drawing which schematically shows a superconductor coated product in cross-section.

The present invention arises from a realization that the principal obstacle to good wetting of substrates by clad coatings is the presence of contaminant barriers between coating and substrate. Allen, Das and Stauffer overcome this problem by extensive reduction of a thin coated niobium foil on the order of 20:1 and preferably 50:1. In the present invention, we selectively remove extensible, nonmetallic contaminants and can achieve supreconductive coatings compared to those of Allen, Das and Stauffer with cold work reductions of less than 10:1. In accord with the best mode of using the present invention, niobium foil is sandblasted to clean its surface. Sandblasting is an economical way to handle moving foils of thin section (less than .05 inch thick) compared to sanding belts, brushes, abrasive wheels and other precleaning techniques. Additionally, the sandblasting can be visually monitored by observing the niobium surface for a uniformly matte surface after blasting.

ABRADING

The sandblasting is done with a refractory grit such as Al oxide, silicon carbide or silicon oxide. After sandblasting the niobium surface may be cleaned by clean aluminum oxide brushes or a blast of dry gas. Some grit may remain, but will not do any harm since it is not malleable and will be dispersed during cold work without spreading over the niobium surface.

BRITTLE FILM

The niobium surface is anodized to produce a layer of niobium oxide between .00001 inch and .0001 inch thereon, which has a characteristic interference color. During the subsequent cold rolling the oxide will be broken up and dispersed over the niobium surface. During the subsequent heating of the tin coated niobium, oxygen will diffuse into the niobium to be dissolved in the niobium and to thereby strengthen the niobium. It has been shown by others that oxygen addition improves the strength of niobium (see Frankowski and Korytoski, Tech. Rpt. SA-TR19-1211, Dec. 11, 1958, Springfield Armory).

An alternative brittle film which may be applied is niobium nitride. This may be applied by electrically sputtering the niobium in an atmosphere of nitrogen subject to a glow discharge utilizing the niobium as a cathode.

Other interstitial elements, (e.g. carbon), may be reacted with the niobium to produce the brittle film of interstitial alloy. But nitrogen and oxygen are preferred. Another method for forming the interstitial compound is to pass the niobium through an atmosphere of nitrogen. Niobium can be heated in a nitrogen atmosphere at about 1100° C. for an hour to form an inner layer of solid solution and an outer layer of nitride at the niobium. Niobium can similarly be heated in an oxygen atmosphere at 600–700° C. for less than a minute. In both cases, the heating will tend to drive off residual malleable contaminants on the niobium.

LAMINATION

Tin foil is abraded and substantially cleaned of grit and then laminated with the film covered niobium to form a composite foil. The composite foil is cold rolled with a reduction of 30–50% in thickness in the first pass to form a clad and with reductions of less than 10% in each of several subsequent passes. There will be little tendency for the cladding bond to give way, or delaminate, on further rolling. A net reduction of 90%, or 10:1, limits the aggregate niobium surface covered with brittle film to 10%. This is spread out in small patches.

HEATING

The reduced foil is then coated with a ceramic powder, such as boron nitride, and then wound into a spiral and heated in a purified argon furnace at temperatures of about 950° C. for one to two hours. Then the spiral is removed from the furnace, water quenched and unwound. A complete coating of boron nitride will prevent sticking of adjacent turns of the spiral.

The resultant product is shown in the drawing with the boron nitride removed. The niobium substrate 10 has a coating 12 of niobium stannide with an outer layer 14 of residual tin. The dots 16 indicate the interstitial element (oxygen or nitrogen) distributed in the niobium with the concentration of interstitial decreasing monotonically with distance from the diffusion layer 12. If an interstitial element is diffused from both surfaces of the niobium, there will be an essentially exponential-pseudo-parabolic curve of distribution arcoss the niobium.

The superconductor shown in the drawing may be plated with a good conductor of heat and electricity—copper, aluminum, cadmium, silver or indium and sheated in a dielectric. The insualted foil can be wound into coils for use as solenoids, armatures, etc. in superconductor devices.

Another use of the process of the present invention is in making superconductive sheets which can be bent into the form of curving walls to shield magnetic fields, as in resonant cavities.

While the invention has been described above in regard to the formation of a niobium base superconductive alloy, the substrate can also be tantalum or vanadium. Similarly, the tin can be supplemented or replaced by metals from Groups III A and IV A of the Periodic Table.

Completely wettable coatings are also desirable for other purposes, such as brazing, and well bonded coatings are useful for such purposes as corrosion resistance. The sandblasting and anodizing technique may be applied to sheets, rods, wires and ribbons of the refractory metals. Then the refractory metal can be clad with a protective coating of a second metal such as aluminum, by rolling or extrusion. This will produce a well bonded protective coating.

Then if complete wettability is desired for brazing or superconductor manufacture, the coated product can be drawn, rolled or swaged to further extend the interface between coating and substrate to disperse contaminants. Subsequent heat treatment produces a diffusion layer at the interface and interstitially hardens the substrate.

*Examples*

In a series of experiments, niobium foil .045" thick was pretreated and roll bonded with tin foil .003" thick, the rolling erducing the composite to thicknesses between .001" and .002". The methods of pretreatment of the foils before roll bonding were:

(1) Vacuum anneal Nb—sand Sn.
(2) Store 2 days in desiccator ($SiO_2$).
(3) Store 2 days in dry argon.
(4) Degrease Nb by acetone wash and dry completely by air—sand Sn.
(5) Wash in Alconox (a commercial mixture of sodium phosphate and sanitizers) and dry with a paper towel.
(6) Wire brush Nb with an Nb wheel and sand Sn.
(7) Sandpaper Sn and Nb.
(8) Abrade Nb with a wheel of felted nylon and refractory abrasive and sand Sn.
(9) Sandpaper Nb and Sn and then anodize Nb.
(10) Sandblast Nb and sandpaper Sn.
(11) Roll at once.
(12) Hold in air for four days before rolling.

In all of the experiments 1–11 good bonding and wetting were obtained. On the other hand, less satisfactory bonding and wetting were obtained by the following techniques:

(13) Degrease Nb with trichloroethylene and dry—sand Sn.
(14) Degrease Nb with ether and dry—sand Sn.
(15) Rolling Nb and Sn while wet with solvent.
(16) Sand Nb and etch Sn, 1 HCl:$1H_2O$.
(17) Etch Nb, $Hf \cdot H_2O_2$ and sand Sn.
(18) Sandpaper Nb and Sn and touch Nb with fingerprint (non-bonding limited to printed area).
(19) Sandpaper Nb and touch with grease or water (non-bonding limited to spread grease or water area).
(20) Sandpaper Nb and Sn and touch with silver chloride solid.

Thus, pretreatment can be limited to selective removal of extensible, nonmetallic contaminants from the surfaces to be roll bonded. Expensive and time consuming removal of brittle contaminants is not necessary to good roll bonding and subsequent reduction. The criterion for sufficient removal of a water film is that the film is no longer visible. A solvent film is sufficiently removed when no odor remains. The certain removal of malleable contaminants allows the reduction of thickness after bonding to be reduced. In one experiment niobium foil was reduced to .019" thickness, vacuum annealed, then sanded and roll bonded with .003" thick tin foil. The roll bonded composite (about .010" thick) was further reduced down to .0035" for a net reduction of 6.3:1.

In another experiment a foil of aluminum was used, instead of tin, and good bonding with and wetting of a sandblasted niobium foil was obtained. In another experiment a foil of Sn-1%·Ga alloy was well bonded to a sandblasted niobium foil and wet it uniformly upon heating.

These experiments demonstrate the validity of the thesis that selective removal of malleable contaminants improves the cladding and wettability treatments. Several embodiments of the invention have been shown, applying this thesis in improved processes and products. Since certain changes can be made in the above processes and products without departing from the scope of the inventions herein involved, it is intended that all matter contained in the above description or shown in the accompaying drawing shall be interpreted as illustrative and not in a limiting sense.

What is claimed is:

1. A method of making superconductors comprising the steps of preparing a foil of a first metal selected from group V B of the Periodic Table, preparing a film of brittle interstitial alloy of the first metal at the foil surface, the film having a thickness between .00001" and .0001", coating the said foil with a second metal selected from Groups III A and IV A of the Periodic Table, cold working the foil to reduce its thickness in excess of 50% to make a clad and disperse the brittle alloy and other residual brittle contaminants whereby the foil surface is rendered wettable by the second metal at elevated temperatures, heating the foil to dissociate the interstitial compound and diffuse the dispersed interstitial element into the foil whereby the foil is strengthened and heating the coated foil to diffuse the second metal into the surface of the foil to form a diffusion layer of superconductive alloy having a higher critical temperature than the first metal.

2. The method of claim 1 wherein the coating is accomplished by roll bonding a foil of the second metal with the said foil of the first metal so that the coating and dispersion of brittle materials are accomplished simultaneously.

3. The method of claim 1 wherein the coating is completed before heating the said foil whereby the diffusion of brittle alloy and second metal is accomplished in the same heating operation.

4. A method of making superconductors comprising the step of preparing a foil of niobium, cleaning the surface of the foil to remove extensible nonmetallic contaminants, covering at least one surface of the foil with a film of a brittle interstitial niobium compound, laminating a foil of a second metal with the niobium foil, the second metal being a soft metal selected from Groups III A and IV A of the Periodic Table and having a surface essentially free of extensible, nonmetallic contaminants, cold rolling the laminated composite to bond the foils together and extend their interface area whereby the brittle film is dispersed, heating the bonded foils between 800° C. and 1200° C. for a sufficient time to form a diffusion layer of superconductive niobium base alloy at the interface whereby the brittle layer diffuses into the niobium below the superconductive layer to strengthen the niobium.

5. The method of claim 4 wherein the brittle compound is niobium oxide.

6. The method of claim 5 wherein the brittle compound is niobium nitride.

7. The method of claim 5 wherein the brittle compound is prepared by sputtering the niobium surface in an ionized atmosphere of nitrogen.

8. The method of claim 4 wherein the second metal is tin with an abraded surface.

9. The method of claim 4 wherein the cleaning step comprises sand blasting the niobium until all shiny zones are eliminated, according to visual inspection.

10. An improved method of cladding whereby interstitial strengthening is introduced comprising the steps of forming a film of interstitial compound on a first metal foil, cladding with a second foil in a mechanical working operation whereby the interstitial compound film is dispersed along the first metal foil and then heating the clad to dissociate the interstitial compound, diffuse the interstitial element into the first metal foil, and diffusion bonding the second metal foil to the first metal foil.

References Cited by the Examiner

UNITED STATES PATENTS

| | | | |
|---|---|---|---|
| 2,993,269 | 7/1961 | Kelly | 29—155.5 |
| 3,181,936 | 5/1965 | Denny et al. | 29—194 |
| 3,218,693 | 11/1965 | Allen et al. | 29—155.5 |

WHITMORE A. WILTZ, *Primary Examiner.*

P. M. COHEN, *Examiner.*